O. V. HANNA.
WHEEL.
APPLICATION FILED MAR. 10, 1913.
1,093,988.
Patented Apr. 21, 1914.
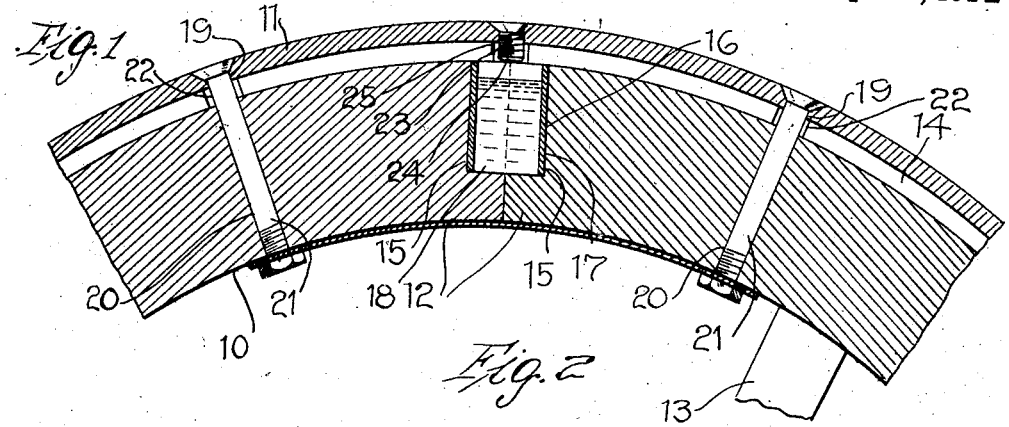
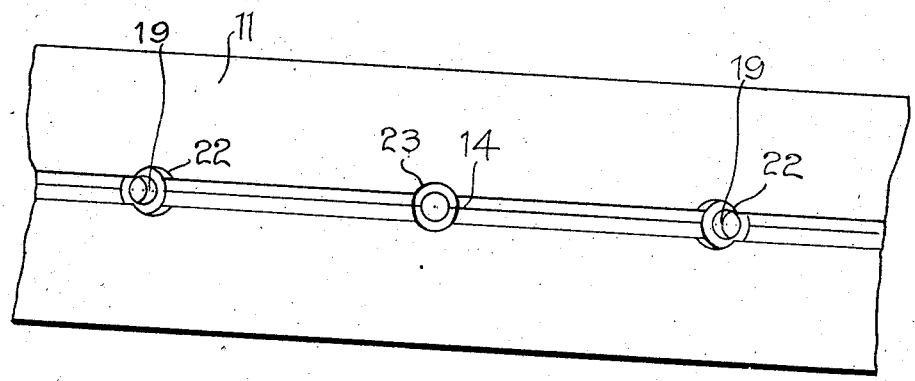
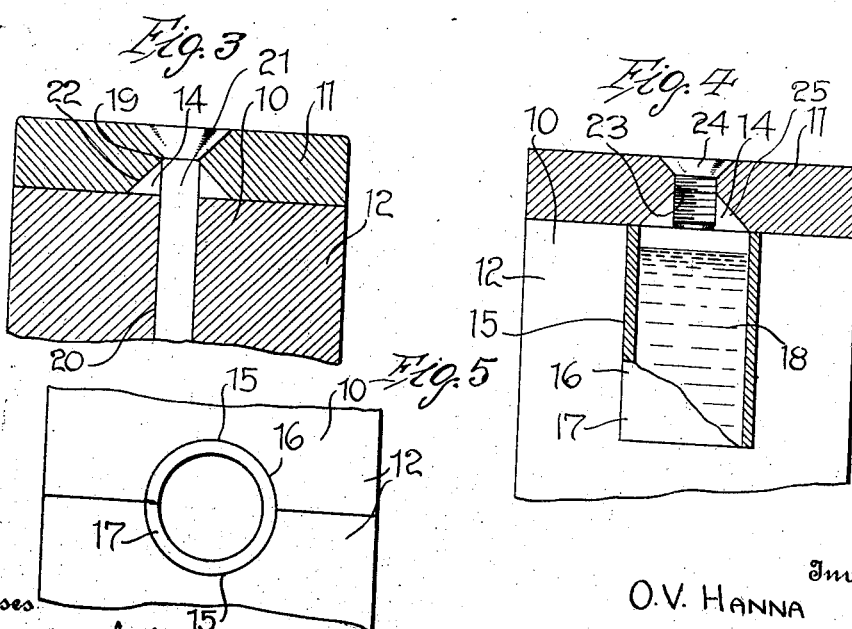
Witnesses
Robert M. Sutphen
A. J. Hind
Inventor
O. V. Hanna
By Watson E. Coleman
Attorney

UNITED STATES PATENT OFFICE.

OSCAR VELANDINGHAM HANNA, OF MERIDIAN, TEXAS.

WHEEL.

1,093,988. Specification of Letters Patent. Patented Apr. 21, 1914.

Application filed March 10, 1913. Serial No. 753,404.

*To all whom it may concern:*

Be it known that I, OSCAR VELANDINGHAM HANNA, a citizen of the United States, residing at Meridian, in the county of Bosque and State of Texas, have invented certain new and useful Improvements in Wheels, of which the following is a specification, reference being had to the accompanying drawings.

This invention relates to new and useful improvements in wheels.

The object of this invention is the provision of a wheel designed for the purpose of preserving the life of the various parts thereof, by supplying oil or other suitable lubricant thereto.

Another object of this invention is the provision of a wheel provided between its felly sections with a plurality of compartments adapted for containing oil or the like, said compartments being connected and in communication by a groove formed in the rim of a wheel, which supplies oil between said felly and rim.

A further object of this invention is to improve and simplify devices of this character, rendering them comparatively simple and inexpensive to manufacture, reliable and efficient in use, and readily operated.

With the above and other objects in view, this invention resides in the novel features of construction, formations, combinations and arrangements of parts to be hereinafter more fully described, claimed and illustrated in the accompanying drawings, in which—

Figure 1 is a longitudinal sectional view of my invention; Fig. 2 is an inner face view of the tire; Figs. 3 and 4 are transverse sectional views; and Fig. 5 is an outer face view of the felly sections.

Referring to the accompanying drawings by similar characters of reference, the numeral 10 designates generally a fragment of a wheel constructed in accordance with my invention, and which consists of the outer tire 11, and segmental felly sections 12, which are connected in the usual manner by the spokes 13 to the hub, not shown. The inner face of the tire 11 is formed intermediate the side edges thereof with a circular groove 14. The adjacent ends of the felly sections 12 are each recessed, as at 15, to produce a resultant socket 16 in which is located a tubular dowel 17, which by its location in the grooves 15 holds the felly sections 12 against any undesired lateral movement. The felly sections 12 and tire 11 are formed with alining apertures 19 and 20, for the reception of bolts 21 by means of which the tire 11 is secured to the felly sections 12. The groove 14 adjacent the bolts 21 are enlarged, as at 22, in order that the free passage of oil through the groove 14 will not be hindered by the portions of the said bolts 21 which pass through the groove 14. Additional openings 23 are provided in the tire 11 in alinement with the cells 18, and afford means whereby the cells can be filled with oil or other suitable lubricant. These openings 23 are threaded to receive the plugs or screws 24, which serve, when in their normal positions, to seal the cells 18 and groove 14 against the removal of the lubricant therefrom. The groove 14 surrounding these screws 24 is enlarged, as at 25, for a purpose similar to the enlargements 22 of the said groove, namely, to prevent the screw 24 from retarding the flow of oil through the said groove 14. The screws 24 also serve the purpose of limiting the passage of oil from the cells 18, by their relative position to the tubular dowels 17.

It should be understood in this connection that various minor changes can be resorted to within the scope of the appended claims without departing from or sacrificing any of the advantages of the invention.

From the foregoing description taken in connection with the accompanying drawings, it will be manifest that a wheel is provided for the purposes set forth, which will fulfil all of the necessary requirements of such a device. It should be further understood that I am not to be limited to the novel features in connection with a wheel, tire and felly, but may apply the same idea to a hub band and hub or to any other suitable object to which the various parts by their peculiar formation, will adapt themselves.

Having thus fully described this invention, what I claim as new and desire to protect by Letters Patent is:—

1. In a wheel, the combination with a tire having a groove therein, a plurality of felly sections having grooves in their meeting ends, tubular dowels disposed within the grooves formed in the meeting ends of said felly sections, the groove in said tire being in communication with the tubular dowels, said tire having an opening in communication with the groove therein, a closure for said opening, and means for securing the tire to the felly sections.

2. In a wheel such as described, the combination with a tire having a circular groove formed therein, of a plurality of felly sections, fastening means extending through the felly sections and tire, the groove in the tire being enlarged adjacent the fastening means, the meeting ends of the felly sections having grooves formed therein producing a socket, a tubular dowel disposed within said socket and holding the felly sections against displacement, said tubular dowel producing a cell, the said tire having an opening formed therein in communication with the groove and the cell, a closure for said opening extending adjacent the mouth of the cell for limiting the movement of fluid from the cell and the groove in the tire adjacent the closure being enlarged as and for the purpose set forth.

3. In a wheel, the combination with a tire, of a plurality of felly sections having registering grooves in their meeting ends, and a tubular dowel disposed within each pair of registering grooves, said tire having an annular opening in communication with each tubular dowel.

In testimony whereof I hereunto affix my signature in the presence of two witnesses.

OSCAR VELANDINGHAM HANNA.

Witnesses:
J. P. WORD,
D. J. CUTBERTH.

Copies of this patent may be obtained for five cents each, by addressing the "Commissioner of Patents, Washington, D. C."